Aug. 4, 1942.   R. B. STEFFENS   2,292,246
DUCT TURN
Filed Aug. 29, 1938

RICHARD B. STEFFENS
INVENTOR.
BY Geo. W. Mills, Jr.
ATTORNEY.

Patented Aug. 4, 1942

2,292,246

UNITED STATES PATENT OFFICE 2,292,246

DUCT TURN

Richard B. Steffens, Wyoming, Ohio, assignor to The Philip Carey Manufacturing Company, a corporation of Ohio Application August 29, 1938, Serial No. 227,247

6 Claims. (Cl. 138—39)

This invention relates to an insulating duct and particularly one made of non-metal material, such as asbestos paper or the like, having elbows or bends in which duct turns or vanes are provided. There are in air conditioning units many turns and bends and it is desired to equip these with duct turns or vanes which may be cheaply made and readily inserted in the bends or elbows of the ducts. They are preferably constructed of non-metal material, such as, asbestos as are the ducts.

Generally described, the invention comprises a sectional conduit having inner and outer shells or casings telescoped together. The sections are made from sheets of any non-metal material, such as, asbestos paper or the like and may be of single thickness or built up to any number of thicknesses adhered together. The inner and outer shells are of the same general construction with the inner shell constructed to the same contour as the outer shell but of sufficiently smaller dimension so that it will snugly fit within the outer shell. The ends of the shells are offset so that sections may be overlapped end to end to build up ducts of any length.

The marginal end of an elbow section may be provided with rows of spaced oppositely aligned slots or grooves to receive the ends of the duct turns or vanes or members associated with the duct turns or vanes for positioning and holding them in place in the ducts. After the duct turns have been fitted in place in the elbow, one shell is moved relatively to the other so that the portion of the elbow in which the duct turns are placed is covered by the outer shell.

The duct turns or vanes are preferably arcuated to about ninety degrees in the case of ninety degree elbows. Or more generally stated, the faces of the duct turns or vanes are formed substantially parallel to the side walls of the ducts. The duct turns or vanes may be formed in any desired manner. They are advantageously formed from a single or multiply tube of asbestos paper, that has one side depressed to arrange the depressed side substantially of the same contour as the non-depressed side or parallel thereto. The depressed side may be spaced a substantial distance from the non-depressed side or the depressed side may be depressed so that there is no intervening space between the two sides. Thus formed, the member may be cut up into lengths substantially equal to the vertical width of the duct core in which they are to be inserted in spaced apart parallel relation.

For a better understanding of the invention reference may be made to the accompanying drawing in which.

Figure 1:
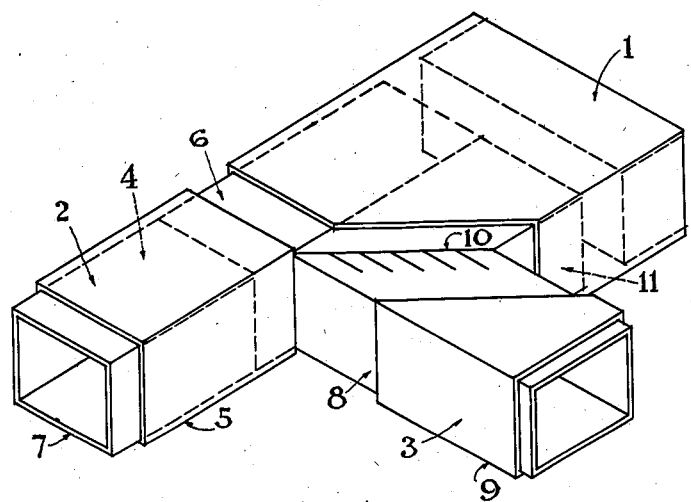
Fig. 1 shows a perspective view of a conduit section embodying the invention.
Figure 2:
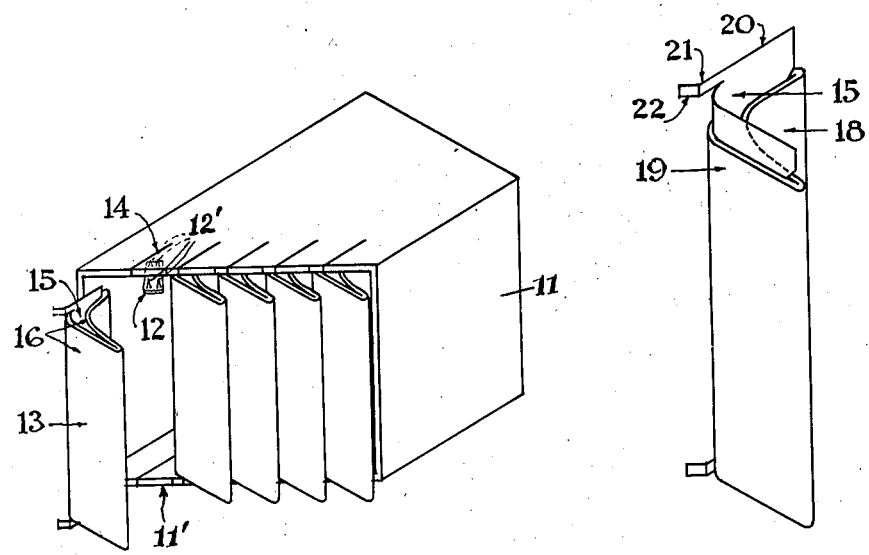
Fig. 2 is a perspective view of a duct section showing the assembly therein of a plurality of duct turns or vanes.
Figure 3:
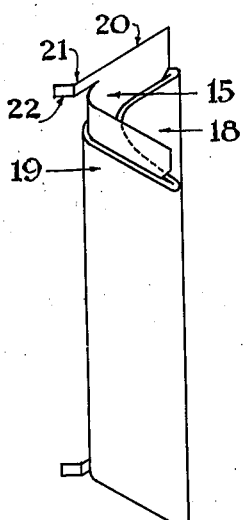
Fig. 3 is a perspective view of a duct turn or vane embodying the invention.

Referring specifically to the drawing in which like numerals are used to designate like parts, numeral 1 designates a larger duct section fitted or joining with two smaller sections 2 and 3, the smaller section 2 continuing in line with the larger section and the smaller section 3 forming an angle therewith. All of the sections preferably comprise an inner shell and outer shell of the same general contour with the inner shell snugly fitted within the outer shell. The shells of the section members may be made of any desired size and shape, but are preferably rectangular in cross-section and of non-metallic material.

Asbestos sheet material is especially desirable for making the sections inasmuch as it is fireproof and non-resonant as to sound. Any fibrous or composition material is, however, suitable, and the shells are of any thickness. One advantage in forming them from sheet material, such as asbestos, is that the sheet may be wound upon a form and built up with any desired number of convolutions suitably adhered together until a shell is of the desired thickness. Inner shell sections fit end to end as a core within outer shell 5 with one end 6 of one section projecting to fit within the larger section 1 and the end 7 of the other section projecting to fit within an adjacent similarly constructed section. Any number of sections may be fitted together to provide a duct of any desired length.

The other smaller section 3 is in the form of a bend or elbow to continue this branch line at an angle to the larger section. This bend or elbow section is of the same general construction as the other section, having an inner shell 8 and an outer shell 9. One end 10 of the inner shell 8 is cut on a diagonal to form an angle with the end 11' of another inner shell 11 also cut on a diagonal. The two diagonal edges are laid in abutting relation and secured by any suitable means such as clips 12, provided on opposite ends with stamped out anchors 12' that are adapted to be embedded in the abutting ends of the core sections. The ends of the inner cores are overlapped or offset with the ends of the outer shells, and then the outer shells are moved to have the ends of adjacent shells in abutting relation. When the parts are assembled, the joints between the ends of the inner shells will break with the joints between the ends of the outer shells. If desired some sealing means may be applied to the projecting ends of the inner shells which are to fit within the ends of the outer shells.

The bends or elbows are advantageously provided with duct turns or vanes 13 disposed in narrowly spaced apart parallel relation. These may be formed of any suitable material bent to form opposite arcuate faces. They are preferably formed from non-metal material, with the ends fitted in slots 14 formed on one or both of the diagonal ends 10 and 11' of the inner shells. The slots may be cut slightly wider than the thickness of the material employed in making the duct turns or vanes in order to receive the ends of the duct turns or vanes therein for holding them in place. Where the duct turns are made from relatively thin metal or non-metal strips this is particularly advantageous. If, however, it is desired to make the duct turns or vanes relatively thick, they still can be readily secured in position in relatively narrow slots by having projecting ends 15 of less thickness than the duct turns or vanes.

It has been found advantageous where the duct turns or vanes are made of non-metal material, such as thin flexible fibrous sheets, to have them of multiply layers. The projecting end 15 may advantageously be a separate member inserted between the layers 16.

Multiply duct turns or vanes can be readily formed by winding a sheet of material, such as asbestos paper, upon a form or mandrel of the same contour or shape as the duct turn or vane to provide a member having arcuate walls or sides 18 and 19 spaced apart to provide an intervening space of substantial width or merely wide enough to receive the inserts hereinafter referred to. Projections 15 are metal inserts bent to conform with the curvature of the duct turn or vanes and are inserted in each end of the duct turn or vanes between the sides 18 and 19, flush with the ends of the duct turns or vanes except for the part 20 which fits in the slots and a portion 21, the bottom edge of which abuts against the end of the duct vane. The end 22 of this portion is bent in either direction to be parallel with the diagonal joint between the diagonal ends. The face of the end 22 abuts the diagonal ends of the member provided with slots 14. Thus the duct turns or vanes are properly aligned if the slots or any of them should be too deeply cut into the duct section. The metal inserts not only serve as projections for engaging with the ducts for securing the duct turns or vanes assembled in position, but they also serve to reenforce and stiffen the duct turns or vanes. The metal inserts may be of any rust proof material such as copper, galvanized iron or the like. It is also advantageous to waterproof the duct turns or vanes. The sheet from which they are made may be saturated and/or coated with a waterproofing material, such as asphalt or tar composition, or they may be coated.

If desired the projections 15 may be provided with an overturned edge or a portion thereof to engage a margin of the conduit section along the slots 14 in order to hold the projecting members 15 against relative lateral movement crosswise of the conduit section. Slight relative movement between members 15 and the conduit is permitted without displacement of the duct turns, in the event that the cross-section of the conduit be enlarged by bending or twisting of the conduit.

While one embodiment has been shown and described for carrying the invention into effect, it will be understood that there may be various changes in details of construction without departing from the spirit of the invention.

I claim:

1. A duct turn or vane comprising a multiply angular body with two adjacent plies spaced apart to provide opposite faces, and a securing means conforming to the general angular contour of the body and readily inserted between the plies with a portion projecting from one end of the body structure.

2. A duct turn or vane comprising a body structure having a removable projection formed on one end for seating in a support, and means extending from the projection adapted to abut the support for positioning the vane.

3. The combination of a duct and a duct turn or vane therefor, recess means provided for seating the ends of the turn or vane, ears provided on the vanes for seating in the recess means, and stop means extending from the ears for limiting insertion of the duct turn within the recess means.

4. A duct turn or vane comprising a body structure having a projection formed on one end for seating in a support, and means extending from the projection adapted to abut the support for positioning the vane.

5. The combination of a duct and a plurality of duct turns or vanes disposed diagonally to the duct, spaced apart recess means for seating the ends of the vanes, ears provided on the vanes for seating in the recess means, and stop means projecting from the ears for aligning the vanes in a straight row.

6. A duct turn or vane comprising a multiply angular body structure having two adjacent plies spaced apart to provide opposite faces, an angular plate of a width corresponding to the width of the turn or vane inserted in the space between the spaced apart plies to reenforce said body structure, said plate provided with means by which the duct turn or vane is secured in position in the duct.

RICHARD B. STEFFENS.